(12) United States Patent
Kuroki et al.

(10) Patent No.: US 7,884,159 B2
(45) Date of Patent: Feb. 8, 2011

(54) PROPYLENE POLYMER COMPOSITION, FILM, STRETCHED FILM, SHRINK FILM AND A METHOD FOR PRODUCING SHRINK PACKAGE

(75) Inventors: Takayuki Kuroki, Ichihara (JP); Norihide Inoue, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 909 days.

(21) Appl. No.: 11/669,489

(22) Filed: Jan. 31, 2007

(65) Prior Publication Data

US 2007/0185271 A1    Aug. 9, 2007

(30) Foreign Application Priority Data

Feb. 1, 2006    (JP) ............... 2006-024549

(51) Int. Cl.
*C08L 23/10* (2006.01)
*C08J 5/18* (2006.01)

(52) U.S. Cl. ............ 525/240; 526/351; 264/291
(58) Field of Classification Search ............ 526/351; 525/240
See application file for complete search history.

(56) References Cited

U.S. PATENT DOCUMENTS

| | | | |
|---|---|---|---|
| 5,371,999 A * | 12/1994 | Hansen et al. ......... | 53/450 |
| 6,143,813 A * | 11/2000 | Sezume et al. ......... | 524/127 |
| 6,395,791 B1 * | 5/2002 | Chaudhary et al. ...... | 521/60 |
| 6,602,956 B2 * | 8/2003 | Zhao et al. ........... | 525/191 |
| 6,855,401 B2 * | 2/2005 | Taylor et al. ......... | 428/212 |
| 6,855,406 B2 | 2/2005 | Takayasu et al. | |
| 7,309,740 B2 | 12/2007 | Masuda et al. | |
| 2003/0152792 A1 | 8/2003 | Takayasu et al. | |
| 2004/0053064 A1 | 3/2004 | Masuda et al. | |

FOREIGN PATENT DOCUMENTS

| | | |
|---|---|---|
| CN | 1442445 A | 9/2003 |
| CN | 1462292 A | 12/2003 |
| JP | 09-278909 | 10/1997 |
| JP | 2000-159949 | 6/2000 |
| JP | 2003-306587 | 10/2003 |
| WO | WO 02/092671 | * 11/2002 |

OTHER PUBLICATIONS

Partial translation to Chinese Office Action in CN Appln No. 200780004327.4 dated Jun. 25, 2010.

* cited by examiner

*Primary Examiner*—Rip A. Lee
(74) *Attorney, Agent, or Firm*—Foley & Lardner LLP

(57) ABSTRACT

A propylene polymer resin composition characterized in that it has a flexural modulus in the range of 200 to 1200 MPa and a melt flow rate (MFR) measured at 230° C. in the range of 0.1 to 30 g/min, and a melt tension (MT (mN)) and an MFR (g/10 min) measured at 230° C. satisfy a specific formula, and a sheet or film obtained therefrom. According to the present invention, there is provided a polyolefin film which is excellent in transparency and especially excellent in transparency and low-temperature heat shrinkable properties after stretching.

7 Claims, No Drawings

PROPYLENE POLYMER COMPOSITION, FILM, STRETCHED FILM, SHRINK FILM AND A METHOD FOR PRODUCING SHRINK PACKAGE

The present invention relates to a propylene polymer composition, a film, a stretched film, a shrink film and a method of producing a shrink-wrapped product. The present invention specifically relates to a propylene polymer composition which may provide a film having a high transparency and a high shrinkage ratio especially at a low temperature when used as a shrink film, and a film, a stretched film, a shrink film and a method of producing a shrink-wrapped product which comprise said composition. Further, the present invention relates to a shrink film which comprises a propylene (co) polymer and is excellent in shrinkage properties and a method of producing a shrink-wrapped product for which said shrink film is used.

BACKGROUND ART

In storing foods, there have been used a polyvinyl chloride and a polyvinylidene chloride as a wrapping film for household or business use. However, since the generation of dioxin is likely to be caused by a large amount of chlorine atoms contained in the raw material resin of these films depending on the disposal and incineration methods, there has been developed a resin composition for a wrapping film which contains no chlorine atoms.

As a polyolefin-based wrapping film which contains no chlorine atoms, there has been conventionally known a single-layer or multilayer film comprising at least one layer of a film comprising a resin composition of a low density polyethylene and various resins and the like and a single-layer or multilayer film comprising at least one layer of a film comprising a resin composition of polypropylene and various resins and the like. In addition, a film obtained by further stretching these films is excellent in heat-shrinkable properties and is used as a film for stretch shrink packaging.

These packaging films are required to have a high shrinkage ratio as well as the transparency and gloss after shrinking in order to protect the contents and improve appearance of the contents.

In Japanese Patent Laid-Open Publication No. 2003-306587, there is disclosed a shrink film comprising a polyolefin resin composition comprising mainly a propylene-α-olefin copolymer having a low melting point (Patent Document 1).

Patent Document 1: Japanese Patent Laid-Open Publication No.

Also, a stretched polypropylene film is well known.

DISCLOSURE OF THE INVENTION

Problems to be the Invention

However, it was found that there was a problem that a film described in Patent Document 1 had an insufficient shrinkage ratio.

Further, it was found that said stretched polypropylene film had a point to be improved with respect to the shrinkage properties.

It is a subject of the present invention to provide a propylene polymer composition which may provide a stretched film having an excellent transparency and especially an excellent transparency as well as excellent heat-shrinkable properties at a low temperature, a film, a stretched film, a shrink film and a method of producing a shrink-wrapped product using said stretched film or shrink film. Further, it is another subject of the present invention to provide a shrink film which comprises a propylene (co)polymer and is excellent in shrinkage properties and a method of producing a shrink-wrapped product using said shrink film.

Means for Solving the Problems

A propylene polymer composition (X) of the present invention has a flexural modulus in the range of 200 to 1200 MPa and a melt flow rate (MFR) in the range of 0.1 to 30 g/10 min measured at 230° C. The melt tension (MT (mN)) and an MFR (g/10 min) measured at 230° C. satisfy the following formula:

$$-0.773 \log(MFR)+1.55 \leqq (MT) \leqq -0.773 \log(MFR)+3.0.$$

A propylene polymer composition (X) of the present invention is a composition comprising at least two kinds of propylene (co)polymers and is a composition preferably comprising 10 to 90% by weight of a propylene (co)polymer (A) which has a melting point in the range of 110 to 170° C. and a melt flow rate (MFR) measured at 230° C. in the range of 0.01 to 10 g/10 min and 90 to 10% by weight of a copolymer (B) of propylene and an α-olefin having 2 to 20 carbon atoms (excluding propylene) which has a melting point in the range of 40 to 100° C. and a melt flow rate (MFR) measured at 230° C. in the range of 0.5 to 50 g/10 min.

A propylene polymer composition (X) of the present invention is preferably a composition in which a propylene (co)polymer (A) has a melt flow rate (MFR) measured at 230° C. in the range of 1.0 to 7.0 g/10 min and a melt tension in the range of 30 to 200 mN.

A propylene polymer composition (Y) of the present invention comprises 10 to 90% by weight of a propylene (co)polymer (A) which has a melting point in the range of 110 to 170° C. and a melt flow rate (MFR) measured at 230° C. in the range of 0.01 to 10 g/10 min and 90 to 10% by weight of a copolymer (B) of propylene and an α-olefin having 2 to 20 carbon atoms (excluding propylene) which has a melting point in the range of 40 to 100° C. and a melt flow rate (MFR) measured at 230° C. in the range of 0.5 to 50 g/10 min (here, the sum of the propylene (co)polymer (A) and the copolymer (B) of propylene and an α-olefin having 2 to 20 carbon atoms (excluding propylene) is set equal to 100% by weight).

A propylene polymer composition (Y) of the present invention preferably is a composition in which a propylene (co)polymer (A) has a melt flow rate (MFR) measured at 230° C. in the range of 1.0 to 7.0 g/10 min and a melt tension in the range of 30 to 200 mN.

A film or sheet of the present invention comprises said propylene polymer composition (X) or said propylene polymer composition (Y).

Further, a stretched film of the present invention is obtained by stretching said sheet or film in at least one direction by 1.5 times or more (hereinafter, a stretched film of the present invention obtained by stretching a sheet or film comprising said propylene polymer composition (X) may be referred to as a "stretched film (1-X)", a stretched film of the present invention obtained by stretching a sheet or film comprising said propylene polymer composition (Y) as a "stretched film (1-Y)" and both of said stretched films in combination as a "stretched film (1-X, Y)").

A shrink film of the present invention comprises said stretched films (hereinafter, a shrink film of the present invention comprising a stretched film obtained by stretching a sheet or film comprising said propylene polymer composition (X) may be referred to as a "shrink film (1-X)", a shrink film of the present invention comprising a stretched film obtained by stretching a sheet or film comprising said propylene polymer composition (Y) as a "shrink film (1-Y)" and both of said shrink films in combination as a "shrink film (1-X, Y)").

Another shrink film (hereinafter, may be referred to as a "shrink film (2-Z)") of the present invention is obtained by stretching a sheet or film obtained by a propylene (co)polymer (A), which has a melting point in the range of 110 to 170° C., a melt flow rate (MFR) measured at 230° C. in the range of 0.01 to 10 g/10 min and a melt tension in the range of 30 to 200 mN, in at least one direction by 1.5 times or more.

In a method of producing a shrink-wrapped product of the present invention, articles are packaged by thermally shrinking said stretched film (1-X, Y).

In a method of producing a shrink-wrapped product of the present invention, articles are packaged by thermally shrinking said shrink film (1-X, Y).

In addition, in a method of producing a shrink-wrapped product of the present invention, articles are packaged by thermally shrinking said shrink film (2-Z).

EFFECT OF THE INVENTION

A propylene polymer composition of the present invention is excellent in transparency when said composition is formed into a film and is further excellent in shrinkage properties of a film at a low temperature especially when said composition is formed into a stretched film.

A stretched film (1-X, Y) of the present invention is excellent in transparency as well as in shrinkage properties at a low temperature and is useful as a shrink film.

Further, a shrink film (2-Z) of the present invention is excellent in transparency as well as in shrinkage properties.

Furthermore, a stretched film (1-X, Y) of the present invention is excellent in shrinkage properties at a low temperature when articles are shrink-packaged by thermally shrinking said film.

A shrink film (1-X, Y) of the present invention is excellent in shrinkage properties at a low temperature when articles are shrink-packaged by thermally shrinking said film.

In addition, a shrink film (2-Z) of the present invention is excellent in shrinkage properties when articles are shrink-packaged by thermally shrinking said film.

BEST MODE FOR CARRYING OUT THE INVENTION

[Propylene Polymer Composition (X)]

A propylene polymer composition (X) of the present invention has a flexural modulus in the range of 200 to 1200 MPa, preferably 300 to 1100 MPa and more preferably 400 to 1000 MPa, as measured in accordance with ASTM D790.

A propylene polymer composition (X) has an MFR (hereinafter abbreviated as MFR230) measured at 230° C. in the range of 0.1 to 30 g/10 min and preferably 0.3 to 20 g/10 min.

Further, the melt tension (MT (mN)) and the MER as measured at 230° C. of a propylene polymer composition (X) of the present invention satisfy the following equation. If they are within these ranges, the resulting film is excellent in heat-shrinkable properties.

$$-0.773 \log(MFR)+1.55 \leq \log(MT) \leq -0.773 \log(MFR)+3.0$$

More preferably, they satisfy the following equation.

$$-0.773 \log(MFR)+1.60 \leq \log(MT) \leq -0.773 \log(MFR)+2.0$$

Here, the melt tension is a value (unit: mN) measured under the conditions of a nozzle diameter of 2.10 mm, L/D=3.8, a piston speed of 15 mm/min and a take-off rate of 15 m/min.

In addition, a propylene polymer composition of the present invention refers to a composition which contains at least one kind of polymer containing a constitutional unit derived from propylene at a ratio of 70 to 100 mol %, provided that the sum of all the constitutional units of said polymer is 100 mol %.

A propylene polymer composition of the present invention is preferably a composition which is formed of at least two kinds of propylene (co)polymers as described below.

In other words, a propylene polymer composition of the present invention preferably comprises 10 to 90% by weight of a propylene (co)polymer (A) which has a melting point in the range of 110 to 170° C. and a melt flow rate (MFR) measured at 230° C. in the range of 0.01 to 10 g/10 min and 90 to 10% by weight of a copolymer (B) of propylene and an α-olefin having 2 to 20 carbon atoms (excluding propylene) which has a melting point in the range of 40 to 100° C. and a melt flow rate (MFR) measured at 230° C. in the range of 0.5 to 50 g/10 min.

[Propylene (Co)polymer (A)]

A propylene (co) polymer (A) has a melting point of 110 to 170° C. and preferably 120 to 170° C., and a melt flow rate (MFR230) measured at 230° C. in the range of 0.01 to 10 g/10 min, preferably 0.1 to 8.0 g/10 min, more preferably 1.0 to 7.0 g/10 min and further more preferably 1.3 to 7.0 g/10 min.

In addition, as the propylene (co)polymer (A), there may be mentioned a propylene homopolymer or a random or block copolymer with ethylene or an α-olefin having 4 to 20 carbon atoms. In terms of heat resistance, transparency and shrinkage properties of the resultant film, preferably used are a propylene homopolymer or a random copolymer. The content of a propylene in the propylene (co)polymer (A) is typically 80 to 100 mol %, preferably 85 to 100 mol % and more preferably 90 to 100 mol %.

The most preferable propylene (co)polymer (A) has a melt tension measured at 230° C. in the range of 30 to 200 mN, preferably 35 to 150 mN and more preferably 40 to 80 mN. The use of such a propylene (co)polymer (A) allows a propylene polymer composition of the present invention to have an optimum melt tension.

Further, it is most preferable that a propylene (co)polymer (A) has a melting point in the range of 110 to 170° C. and preferably 120 to 170° C., an MFR in the range of 0.01 to 10 g/10 min, preferably 0.1 to 8.0 g/10 min, more preferably 1.0 to 7.0 g/10 min and especially preferably 1.3 to 7.0 g/10 min and a melt tension (MT) measured at 230° C. in the range of 30 to 200 mN, preferably 35 to 150 mN and more preferably 40 to 80 mN. If they are within these ranges, the resulting film is excellent in fluidity as well as in shrinkage properties after stretching.

Meanwhile, the statement that a melting point is in the range of 110 to 170° C. means that when a propylene (co) polymer has a plurality of melting points, any melting points are in the above-mentioned range. For example, when component (A) is a mixture of two or more kinds of propylene (co)polymers, it has a plurality of melting points, wherein any of these melting points are in the above-mentioned range.

In addition, the statement that an MFR is in the range of 0.01 to 10 g/10 min means that, for example, when component (A) is a mixture of two or more kinds of propylene (co)polymers, the MFR of said mixture is in the above-mentioned range, and the statement that a melt tension is in the range of 30 to 200 mN means that, for example, when component (A) is a mixture of two or more kinds of propylene (co)polymers, the melt tension of said mixture is in the above-mentioned range.

Further, when component (A) is a mixture, each propylene-based polymer constituting the mixture has typically a melting point of 110° C. or more.

Furthermore, when component (A) is a mixture, each propylene-based polymer constituting the mixture has typically a propylene content of 80 to 100 mol %, preferably 85 to 100 mol % and more preferably 90 to 100 mol %.

Such a propylene (co)polymer (A) may be typically produced by polymerizing propylene or copolymerizing propylene with other α-olefins in the presence of a catalyst mainly comprising a solid-state titanium catalyst and an organometallic compound or a metallocene catalystusing a metallocene compound as one component of the catalyst. Moreover, a commercially-available product may be used.

[Copolymer (B) of Propylene with an α-Olefin having 2 to 20 Carbon Atoms (excluding Propylene)]

A copolymer (B) (hereinafter, may be simply referred to as a "copolymer of propylene with an α-olefin having 2 to 20 carbon atoms) of propylene with an α-olefin having 2 to 20 carbon atoms (excluding propylene) used in a film of the present invention is a random copolymer of propylene with an α-olefin having 2 to 20 carbon atoms (excluding propylene) and has a melting point in the range of 40 to 100° C., preferably 45 to 100° C. and more preferably 45 to 90° C., as measured by DSC method (the endothermic peak observed when a sample is maintained at 200° C. for 5 minutes, and then cooled to −20° C. at a cooling rate of −20° C./min and subsequently heated again to 180° C. at a heating rate of 20° C./min). A copolymer (B) of propylene with an α-olefin having 2 to 20 carbon atoms has an MFR 230 in the range of 0.5 to 50 g/10 min, preferably 1.0 to 30 g/10 min and more preferably 1.0 to 20 g/10 min. As the α-olefin having 2 to 20 carbon atoms (excluding propylene), there may be mentioned ethylene and an α-olefin having 4 to 20 carbon atoms. The content of a constitutional unit derived from an α-olefin having 2 to 20 carbon atoms (excluding propylene) is typically 5 to 50 mol %, preferably 10 to 35 mol % and more preferably 16 to 35 mol %. In this case, the sum of the constitutional unit derived from propylene and the constitutional unit derived from an α-olefin having 2 to 20 carbon atoms (excluding propylene) is 100 mol %. Moreover, the α-olefin having 2 to 20 carbon atoms (excluding propylene) includes, preferably, an α-olefin having 4 to 10 carbon atoms, more preferably, 1-butene, 1-hexene, 4-methyl-1-pentene and 1-octene, and further more preferably 1-butene.

Such a propylene copolymer (B) of propylene with an α-olefin having 2 to 20 carbon atoms may be typically produced by copolymerizing propylene with an α-olefin in the presence of a catalyst mainly comprising a solid-state titanium catalyst and an organometallic compound or a metallocene catalyst using a metallocene compound as one component of the catalyst.

As a preferable specific example of a copolymer (B) of propylene with an α-olefin having 2 to 20 carbon atoms, there may be mentioned a copolymer of propylene with an α-olefin having 2 to 20 carbon atoms, which is obtained by using a metallocene catalyst and has a melting point in the range of 45 to 90° C. and a comonomer constitutional unit content M (mol %) as measured by $^{13}$C-NMR and said melting point Tm (° C.) are in the range given by $146 \exp(-0.022M) \geq Tm \geq 125 \exp(-0.032M)$. That is to say, M represents a ratio expressed in mol % of a constitutional unit derived from an α-olefin having 2 to 20 carbon atoms (excluding propylene) to a total of the constitutional unit derived from propylene and the constitutional unit derived from an α-olefin having 2 to 20 carbon atoms (excluding propylene). Such copolymer of propylene with an α-olefin having 2 to 20 carbon atoms may be obtained by, but not limited to, for example, using a metallocene catalyst as described in International Publication WO 2004/087775 Pamphlet. Especially when a copolymer obtained by polymerizing using a metallocene catalyst is used, there may be obtained a film which has low stickiness as well as excellent shrinkage properties. In this case, the molecular weight distribution obtained by the gel permeation chromatography (GPC) for the copolymer (B) of propylene with an α-olefin having 2 to 20 carbon atoms is in the range of 1 to 3.

If the physical properties of said copolymer (B) of propylene with an α-olefin having 2 to 20 carbon atoms are in the above-mentioned ranges, there may be obtained a film excellent in transparency and shrinkage properties which are characteristics of a film of the present invention.

A propylene polymer composition (X) of the present invention is preferably a composition comprising 10 to 90% by weight, preferably 20 to 80% by weight of said propylene (co)polymer (A) and 90 to 10% by weight, preferably 80 to 20% by weight of a copolymer (B) of propylene with an α-olefin having 2 to 20 carbon atoms (here, the sum of component (A) and component (B) is 100% by weight).

Meanwhile, in the present invention, "comprising (A) and (B)" means that an optional component other than component (A) and component (B) may be contained.

Unless the effect of the present invention is impaired, a propylene polymer composition (X) of the present invention may contain other polyolefin resins such as a polyethylene resin. Moreover, to the propylene polymer composition (X) of the present invention may be added a tackifier and a surfactant in order to adjust tackiness and anti-fogging properties.

As the tackifier, there may be mentioned a hydrocarbon liquid substance such as polybutene, an olefin-based oligomer, liquid paraffin and a petroleum resin such as an aliphatic-based petroleum resin.

As the surfactant, there may be mentioned a fatty acid monoglyceride, a fatty acid glyceride, a sorbitan fatty acid ester and the like. These may be used alone or as a mixture of two kinds or more thereof.

Further, when the shrinkage properties are intended to be further improved, there may be added, for example, an alicyclic saturated hydrocarbon resin such as that described in Japanese Patent Laid-Open Publication No. 2003-306587.

Furthermore, there may be added a heat stabilizer, an antioxidant, an ultraviolet absorber, an anti-blocking agent, a slipping agent, an antistatic agent, a weathering stabilizer, a crystal nucleating agent, a base absorber, a lubricant, a flame retardant and the like so long as the objective of the present invention is not impaired.

[Propylene Polymer Composition (Y)]

A propylene polymer composition (Y) of the present invention comprises 10 to 90% by weight of a propylene (co)polymer (A) which has a melting point in the range of 110 to 170° C. and a melt flow rate (MFR) measured at 230° C. in the range of 0.01 to 10 g/10 min and 90 to 10% by weight of a copolymer (B) of propylene with an α-olefin (excluding propylene) having 2 to 20 carbon atoms which has a melting point in the range of 40 to 100° C. and a melt flow rate (MFR) measured at 230° C. in the range of 0.5 to 50 g/10 min (in this case, the sum of propylene (co)polymer (A) and the copolymer (B) of propylene and an α-olefin (excluding propylene) having 2 to 20 carbon atoms is set equal to 100% by weight).

[Propylene (Co)polymer (A)]

As propylene (co) polymer (A), there may be mentioned the same propylene (co)polymer (A) as explained in the section of propylene polymer composition (X). In other words, the propylene (co) polymer (A) preferably has a melting point in the range of 110 to 170° C. and preferably 120 to 170° C. and a melt flow rate (MFR230) measured at 230° C. in the range of 0.01 to 10 g/10 min and preferably 0.1 to 8.0 g/10 min, more preferably 1.0 to 7.0 g/10 min and further more preferably 1.3 to 7.0 g/10 min. Further, as the propylene (co)polymer (A), there may be mentioned a propylene homopolymer or a random or block copolymer with ethylene or an α-olefin having 4 to 20 carbon atoms. In terms of heat resistance, transparency and shrinkage properties of the resultant film, preferably used are a propylene homopolymer or a random copolymer. The propylene content of the propylene (co)polymer (A) is typically 80 to 100 mol %, preferably 85 to 100 mol % and more preferably 90 to 100 mol %.

The most preferable propylene (co)polymer (A) has a melt tension measured at 230° C. in the range of 30 to 200 mN, preferably 35 to 150 mN and more preferably 40 to 80 mN. The use of such a propylene (co)polymer (A) allows a propylene polymer composition of the present invention to have an optimum melt tension.

Further, most preferably the propylene (co)polymer (A) has a melting point in the range of 110 to 170° C. and preferably 120 to 170° C., an MFR in the range of 0.01 to 10 g/10 min, preferably 0.1 to 8.0 g/10 min, more preferably 1.0 to 7.0 g/10 min and especially preferably 1.3 to 7.0 g/10 min and a melt tension (MT) measured at 230° C. in the range of 30 to 200 mN, preferably 35 to 150 mN and more preferably 40 to 80 mN. If they are in these ranges, the resulting film is excellent in fluidity as well as in shrinkage properties after stretching.

Meanwhile, the statement that a melting point is in the range of 110 to 170° C. means that when a propylene (co) polymer has a plurality of melting points, any melting points are in the above-mentioned range. For example, when component (A) is a mixture of two or more kinds of propylene (co)polymers, it has a plurality of melting points, wherein any of these melting points are in the above-mentioned range.

In addition, the statement that an MFR is in the range of 0.01 to 10 g/10 min means that, for example, when component (A) is a mixture of two or more kinds of propylene (co)polymers, said mixture has an MFR in the above-mentioned range, and the statement that a melt tension is in the range of 30 to 200 mN means that, for example, when component (A) is a mixture of two or more kinds of propylene (co)polymers, said mixture has a melt tension in the above-mentioned range.

Further, when component (A) is a mixture, each propylene-based polymer constituting the mixture has typically a melting point of 110° C. or more.

Furthermore, when component (A) is a mixture, each propylene-based polymer constituting the mixture has typically a propylene content of 80 to 100 mol %, preferably 85 to 100 mol % and more preferably 90 to 100 mol %.

Such a propylene (co)polymer (A) may be typically produced by polymerizing propylene or copolymerizing propylene with other α-olefins in the presence of a catalyst comprising mainly a solid-state titanium catalyst and an organometallic compound or a metallocene catalyst using a metallocene compound as one component of the catalyst.

[Copolymer (B) of Propylene with an α-Olefin having 2 to 20 Carbon Atoms (excluding Propylene)]

As the copolymer (B) (hereinafter, may be simply referred to as a "copolymer (B) of propylene with an α-olefin having 2 to 20 carbon atoms) of propylene with an α-olefin having 2 to 20 carbon atoms (excluding propylene) used in a film or sheet of the present invention, there may be mentioned the same copolymer as copolymer (B) of propylene with an with an α-olefin having 2 to 20 carbon atoms explained in the section of the propylene polymer composition (X). That is, the copolymer (B) of propylene with an α-olefin having 2 to 20 carbon atoms is a random copolymer of propylene with an α-olefin having 2 to 20 carbon atoms (excluding propylene) and has a melting point in the range of 40 to 100° C., preferably 45 to 100° C. and more preferably 45 to 90° C., as measured by DSC method (the endothermic peak observed when a sample is maintained at 200° C. for 5 minutes, and then cooled to −20° C. at a cooling rate of −20° C./min and subsequently heated again to 180° C. at a heating rate of 20° C./min). A copolymer (B) of propylene with an α-olefin having 2 to 20 carbon atoms has an MFR230 in the range of 0.5 to 50 g/10 min, preferably 1.0 to 30 g/10 min and more preferably 1.0 to 20 g/10 min. As the α-olefin having 2 to 20 carbon atoms (excluding propylene), there may be mentioned ethylene and an α-olefin having 4 to 20 carbon atoms. The content of a constitutional unit derived from an α-olefin having 2 to 20 carbon atoms (excluding propylene) is typically 5 to 50 mol preferably 10 to 35 mol % and more preferably 16 to 35 mol %. In this case, the sum of the constitutional unit derived from propylene and the constitutional unit derived from an α-olefin having 2 to 20 carbon atoms (excluding propylene) is 100 mol %. Moreover, the α-olefin having 2 to 20 carbon atoms (excluding propylene) includes, preferably, an α-olefin having 4 to 10 carbon atoms, more preferably, 1-butene, 1-hexene, 4-methyl-1-pentene and 1-octene, and further more preferably 1-butene.

Such a copolymer (B) of propylene with an α-olefin having 2 to 20 carbon atoms may be typically produced by copolymerizing propylene with an α-olefin in the presence of a catalyst comprising mainly a solid-state titanium catalyst and an organometallic compound or a metallocene catalyst using a metallocene compound as one component of the catalyst.

As a preferable specific example of a copolymer (B) of propylene with an α-olefin having 2 to 20 carbon atoms, there may be mentioned a copolymer of propylene with an α-olefin having 2 to 20 carbon atoms, which is obtained by using a metallocene catalyst, and has a melting point in the range of 45 to 90° C. and a comonomer constitutional unit content M (mol %) as measured by $^{13}$C-NMR and said melting point Tm (CC) are in the range given by $146 \exp(-0.022M) \geq Tm \geq 125 \exp(-0.032M)$. That is to say, M represents a ratio expressed in mol % of a constitutional unit derived from an α-olefin having 2 to 20 carbon atoms (excluding propylene) to a total of the constitutional unit derived from propylene and the constitutional unit derived from an α-olefin having 2 to 20 carbon atoms. Such copolymer of propylene with an α-olefin having 2 to 20 carbon atoms may be obtained by, but not limited to, for example, using a metallocene catalyst as described in International Publication WO 2004/087775 Pamphlet.

Especially when a copolymer obtained by polymerizing using a metallocene catalyst is used, there may be obtained a film which has low stickiness as well as excellent shrinkage properties. In this case, the molecular weight distribution obtained by the gel permeation chromatography (GPC) for the copolymer (B) of propylene with an α-olefin having 2 to 20 carbon atoms is in the range of 1 to 3

If the physical properties of said copolymer (B) of propylene with an α-olefin having 2 to 20 carbon atoms are in the above-mentioned ranges, there may be obtained a film excellent in transparency and shrinkage properties which are characteristic of a film of the present invention.

A propylene polymer composition (Y) of the present invention is preferably a composition comprising 10 to 90% by weight, preferably 20 to 80% by weight of said propylene (co)polymer (A) and 90 to 10% by weight, preferably 80 to 20% by weight of a copolymer (B) of propylene with an α-olefin having 2 to 20 carbon atoms (here, the sum of component (A) and component (B) is 100% by weight).

Meanwhile, in the present invention, "comprising (A) and (B)" means that an optional component other than component (A) and component (B) may be contained.

Unless the effect of the present invention is impaired, a propylene polymer composition (Y) of the present invention may contain other polyolefin resins such as a polyethylene resin. Moreover, to the propylene polymer composition (Y) of the present invention may be added a tackifier and a surfactant in order to adjust tackiness and anti-fogging properties.

As the tackifier, there may be mentioned a hydrocarbon liquid substance such as polybutene, an olefin-based oligomer, liquid paraffin and a petroleum resin such as an aliphatic-based petroleum resin.

As the surfactant, there may be mentioned a fatty acid monoglyceride, a fatty acid glyceride, a sorbitan fatty acid ester and the like. These may be used alone or as a mixture of two kinds or more thereof.

Further, when the shrinkage properties are intended to be further improved, there may be added, for example, an alicyclic saturated hydrocarbon resin such as that described in Japanese Patent Laid-Open Publication No. 2003-306587.

Furthermore, there may be added a heat stabilizer, an antioxidant, an ultraviolet absorber, an anti-blocking agent, a slipping agent, an antistatic agent, a weathering stabilizer, a crystal nucleating agent, a base absorber, a lubricant, a flame retardant and the like so long as the objective of the present invention is not impaired.

[Propylene (Co)polymer (A1)]

Propylene (co)polymer (A1) used for the production of a shrink film (shrink film (2-Z)) of the present invention has a melting point in the range of 110 to 170° C., a melt flow rate (MFR) measured at 230° C. in the range of 0.01 to 10 g/10 min and a melt tension in the range of 30 to 200 mN.

A propylene (co)polymer (A1) has a melting point in the range of 110 to 170° C. and preferably 120 to 150° C. and a melt flow rate (MFR230) measured at 230° C. in the range of 0.01 to 10 g/10 min and preferably 0.1 to 8.0 g/10 min, more preferably 1.0 to 7.0 g/10 min and further more preferably 1.3 to 7.0 g/10 min.

Further, as the propylene (co)polymer (A1), there may be mentioned a propylene homopolymer, or a random or block copolymer with ethylene or an α-olefin having 4 to 20 carbon atoms. In terms of heat resistance, transparency and shrinkage properties of the resultant film, preferably used are a propylene homopolymer or a random copolymer. The propylene content of the propylene (co)polymer (A1) is typically 80 to 100 mol %, preferably 85 to 100 mol % and more preferably 90 to 100 mol %.

The most preferable propylene (co)polymer (A1) has a melt tension measured at 230° C. in the range of 30 to 200 mN, preferably 35 to 150 mN and more preferably 40 to 80 mN. The use of such a propylene (co)polymer (A1) allows a resin composition of the present invention to have an optimum melt tension.

Further, it is most preferable that the propylene (co)polymer (A1) has a melting point in the range of 110 to 170° C. and preferably 120 to 170° C., an MFR in the range of 0.01 to 10 g/10 min, preferably 0.1 to 8.0 g/10 min, more preferably 1.0 to 7.0 g/10 min and especially preferably 1.3 to 7.0 g/10 min and a melt tension (MT) measured at 230° C. in the range of 30 to 200 mN, preferably 35 to 150 mN and more preferably 40 to 80 mN. If they are in these ranges, the resulting film is excellent in fluidity as well as in shrinkage properties after stretching.

Meanwhile, the statement that a melting point is in the range of 110 to 170° C. means that when a propylene (co)polymer has a plurality of melting points, any melting points are in the above-mentioned range. For example, when component (A1) is a mixture of two or more kinds of propylene (co)polymers, it has a plurality of melting points, wherein any of these melting points are in the above-mentioned range.

In addition, the statement that an MFR is in the range of 0.01 to 10 g/10 min means that, for example, when component (A1) is a mixture of two or more kinds of propylene (co)polymers, said mixture has an MFR in the above-mentioned range, and the statement that a melt tension is in the range of 30 to 200 mN means that, for example, when component (A1) is a mixture of two or more kinds of propylene (co)polymers, said mixture has a melt tension in the above-mentioned range.

Further, when component (A1) is a mixture, each propylene-based polymer constituting the mixture has typically a melting point of 110° C. or more.

Furthermore, when component (A1) is a mixture, each propylene-based polymer constituting the mixture has typically a propylene content of 80 to 100 mol %, preferably 85 to 100 mol % and more preferably 90 to 100 mol %.

Such a propylene (co)polymer (A1) may be typically produced by polymerizing propylene or copolymerizing propylene with other α-olefins in the presence of a catalyst mainly comprising a solid-state titanium catalyst and an organometallic compound or a metallocene catalyst using a metallocene compound as one component of the catalyst.

Further, a propylene (co)polymer (A1) more preferably satisfies a relational formula of $-0.773 \log(MFR)+1.55 \geq \log(MT)$.

Moreover, a propylene (co)polymer (A1) more preferably satisfies a relational formula of $-0.773 \log(MFR)+1.60 \geq \log(MT)$.

When such a propylene (co)polymer (A1) is used, the resulting film is excellent in transparency as well as in shrinkage properties.

Unless the effect of the present invention is impaired, a film or sheet comprising said propylene (co)polymer (A1) of the present invention may contain other polyolefin resins such as a polyethylene resin.

Moreover, to a film or sheet comprising said propylene (co)polymer (A1) of the present invention may be added a tackifier and a surfactant in order to adjust tackiness and anti-fogging properties.

As the tackifier, there may be mentioned a hydrocarbon liquid substance such as polybutene, an olefin-based oligomer, liquid paraffin and a petroleum resin such as an aliphatic-based petroleum resin.

As the surfactant, there may be mentioned a fatty acid monoglyceride, a fatty acid glyceride, a sorbitan fatty acid ester and the like. These may be used alone or as a mixture of two kinds or more thereof.

Further, when the shrinkage properties are intended to be further improved, there may be added, for example, an alicyclic saturated hydrocarbon resin such as described in Japanese Patent Laid-Open Publication No. 2003-306587.

Furthermore, there may be added a heat stabilizer, an antioxidant, an ultraviolet absorber, an anti-blocking agent, a slipping agent, an antistatic agent, a weathering stabilizer, a crystal nucleating agent, a base absorber, a lubricant, a flame retardant and the like so long as the objective of the present invention is not impaired.

[Sheet or Film]

A sheet or film of the present invention may be produced by forming the above-mentioned propylene polymer composition (X) or (Y) of the present invention into a sheet or film. The thickness of the film or sheet of the present invention is not specifically limited, but typically 3 to 2000 µm and preferably 5 to 1500 µm from the viewpoints of strength, flexibility and transparency of a sheet or a film.

A film or sheet of the present invention may be used as a laminate with a polyolefin film such as polyethylene, polypropylene, a cyclic olefin (co)polymer and a copolymer of a cyclic olefin with an olefin such as ethylene or propylene, a polyester film and a polyamide film, if necessary.

As for a method of producing a film of the present invention, a film may be produced by using a T-die molding machine or an inflation molding machine used for typical film molding of a polyolefin.

Further, in the present invention, a film or sheet comprising a propylene (co)polymer (A1) is produced and used to produce a stretched film. In this case, the thickness of the film or sheet comprising a propylene (co)polymer (A1) is typically 3 to 2000 µm and preferably 5 to 1500 µm from the viewpoints of strength, flexibility and transparency of a sheet or film. Said film or sheet of the present invention may be also used as a laminate with a polyolefin film such as polyethylene, polypropylene, a cyclic olefin (co)polymer and a copolymer of a cyclic olefin with an olefin such as ethylene or propylene, a polyester film and a polyamide film, if necessary.

As for a method of producing said film or sheet, it may be produced by using a T-die molding machine or an inflation molding machine used for typical film molding or sheet molding of a polyolefin.

[Stretched Film]

The above sheet or film of the present invention may be stretched in at least one direction by 1.5 times or more to obtain a stretched film of the present invention (a stretched film (1-X, Y)).

A stretched film (a stretched film (1-X, Y)) is excellent in heat-shrinkable properties, is suitably used as a shrink film and may be suitably used as a film for shrink packaging (including a shrink label).

As a stretching method, there may be used a well-known method of producing a polyolefin stretched film. There may be specifically mentioned a roll stretching, tenter stretching and tubular stretching. A draw ratio is typically 1.5 to 20 times and preferably 2 to 15 times.

Further, a film or sheet comprising the above propylene (co)polymer (A1) is stretched in at least one direction by 1.5 times or more to obtain a stretched film (a stretched film (2-Z)).

The stretched film (2-Z) is excellent in heat-shrinkable properties, is used as a shrink film (shrink film (2-z)), and may be suitably used as a film for shrink packaging (including a shrink label).

As a stretching method, there may be used a well-known method of producing a polyolefin stretched film. There may be specifically mentioned a roll stretching, tenter stretching and tubular stretching. A draw ratio is typically 1.5 to 20 times and preferably 2 to 15 times.

[Shrink Film]

A shrink film (a shrink film (1-X, Y)) and a shrink film (2-Z)) of the present invention may be used as a film for shrink packaging. In the present invention, "for shrink packaging" includes not only an application in which the whole of articles to be packaged is covered by a shrink film of the present invention, but also an application in which a part of articles to be packaged is covered by a shrink film (including a shrink label).

A shrink film of the present invention is specifically used for food packaging, packaging of daily necessities and writing materials, pallet packaging and the like.

[Method of Producing Shrink-Wrapped Product]

In a method of producing a shrink-wrapped product of the present invention, the above stretched film (1-X, Y) is heat shrunk to package articles.

In another method of producing a shrink-wrapped product of the present invention, the above shrink film (1-X, Y) is heat shrunk to package articles.

In using a stretched film (1-X, Y) or shrink film (1-X, Y), a shrinkage temperature used for heat shrinkage is not specifically limited, but for example, the film is heated in an atmosphere in the range of 70 to 160° C. (for example, in an oven).

In further another method of producing a shrink-wrapped product of the present invention, a shrink film (2-Z) is heat shrunk to package articles.

In using a shrink film (2-Z), a shrinkage temperature used for heat shrinkage is not specifically limited, but for example, the film is heated in an atmosphere in the range of 70 to 160° C. (for example, in an oven).

EXAMPLES

Next, the present invention will be explained with reference to Examples, but the present invention is not limited by these Examples.

[Evaluation Method]

MFR230: Measurements were made at a temperature of 230° C. under a load of 2.16 kg, in accordance with ASTM D1238.

Melt Tension: Measurements were made under the conditions of a measurement temperature of 230° C., a nozzle diameter of 2.10 mm, L/D=3.8, a piston speed of 15 mm/min and a take-off rate of 15 m/min.

Flexural Modulus: Measurements were made for a test specimen which was obtained by injection molding and then allowed to stand at 23° C. for 24 hours or more, in accordance with ASTM D790.

Haze: Measurements were made in accordance with ASTM D1003.

Melting Point: Measurements were made at a heat-up rate of 20° C./min by using a differential scanning calorimeter (DSC).

Thermal Shrinkage Ratio: The dimensions of a sample film after stretching were measured and then the sample film was allowed to stand at 100° C. for 30 minutes in an oven and subsequently the dimensions after shrinkage was measured to determine the thermal shrinkage ratio.

Reference Example 1

A 2000 ml-polymerization equipment which was fully substituted with nitrogen was charged with 866 ml of dry hexane, 90 g of 1-butene and triisobutylaluminum (1.0 mmol) at room temperature. Then the inside temperature of the polymerization equipment was increased to 65° C. and was pressurized to 0.7 MPa with propylene.

Next, a toluene solution containing dimethylmethylene(3-tert-butyl-5-methylcyclopentadienyl) fluorenylzirconium dichloride and methylaluminoxane was prepared by contacting dimethylene (3-tert-butyl-5-methylcyclopentadienyl) fluorenylzirconium dichloride with a toluene solution containing methylaluminoxane (manufactured by Tosoh Finechem Corporation) so as to be the Zr/Al ratio (molar ratio) of 1/300. From the solution, a part of solution containing 0.002 mmol of dimethylmethylene(3-tert-butyl-5-methylcyclopentadienyl) fluorenylzirconium dichloride and methylalumonoxane equivalent to 0.6 mmol of aluminum was taken out, and then added to the polymerization equipment and polymerization was conducted for 30 minutes while maintaining the inside temperature of 65° C. and the propylene pressure of 0.7 MPa and subsequently the polymerization was terminated by adding 20 ml of methanol.

After the pressure was released, a polymer was precipitated from the polymerization solution in 2 L of methanol and dried under vacuum at 130° C. for 12 hours. The amount of the resulting polymer was 12.5 g.

The resulting polymer had a butene content of 26.9 mol %, a melting point of 74.7° C., an MFR (230° C., 2 kg load) of 6.95 g/10 min and an Mw/Mn of 2.10.

The polymerization was conducted by scaling up the method to obtain a required amount of the polymer (PBR-1; MFR230: 7.0 g/10 min, melting point: 75° C., 1-butene content: 27 mol %, and molecular weight distribution: 2.1).

Example 1

The following resin compositions were used to obtain a film having a thickness of 300 µm by using a single layer T-die molding machine having a width of 300 mm equipped with an extruder with a diameter of 40 mm φ. Further, this film was successively biaxially stretched 1.5 times in the longitudinal direction and 5 times in the transverse direction at 110° C. by using a batch-type, biaxial stretching machine to obtain a stretched film. The physical properties of the resulting stretched film are shown in Table 1.

A resin composition: A resin composition comprising 50% by weight of a random polypropylene having an MFR230 of 0.5 g/10 min and a melting point of 140° C. and 50% by weight of a propylene-1-butene random copolymer (produced by using a metallocene catalyst) having an MFR230 of 7.0 g/10 min, a melting point of 75° C. and 1-buten content of 27 mol %).

Comparative Examples 1 and 2

Stretched films were obtained by the same method as that of Example 1, except that the resin compositions described in Table 1 were used as a resin composition. The physical properties of the resulting stretched film are shown in Table 1.

Example 2

A stretched film was obtained by the same method as that of Example 1, except that the resin composition described in Table 1 was used as a resin composition. The physical properties of the resulting stretched film are shown in Table 1.

Example 3

The following propylene (co)polymer was used to obtain a film having a thickness of 300 µm by using a single layer T-die molding machine having a width of 300 mm and equipped with an extruder having a diameter of 40 mm φ. This film was further successively biaxially stretched 1.5 times in the longitudinal direction and 5.0 times in the transverse direction at 110° C. by using a batch-type, biaxial stretching machine to obtain a stretched film. The physical properties of the resulting stretched film are shown in Table 1.

TABLE 1

|  | Example 1 | Example 2 | Comparative Example 1 | Comparative Example 2 | Example 3 |
|---|---|---|---|---|---|
| Polymer Composition |  |  |  |  |  |
| PP-1 wt % | 50 | 25 | — | — | 45 |
| PP-2 wt % | — | 30 | — | — | 55 |
| PP-3 wt % | — | — | 100 | 50 | — |
| PBR-1 wt % | 50 | 45 | — | 50 | — |
| Physical Properties of Polymer Composition |  |  |  |  |  |
| MFR230 g/10 min | 1.9 | 2.8 | 3.2 | 4.9 | 1.8 |
| MT mN | 23 | 22 | 13 | 8.2 | 49 |
| Flexural Modulus MPa | 620 | 700 | 1100 | 590 | 1300 |
| Physical Properties of Stretched Film |  |  |  |  |  |
| Haze (before shrinkage) % | 1.5 | 2.5 | 1.8 | 1.8 | 4.3 |
| Thermal Shrinkage Ratio % | 48 | 58 | 14 | 26 | 20 |

PP-1; MFR230 0.5 g/10 min, MT = 60 mN, melting point 140° C. B241, manufactured by Prime Polymer Co., Ltd. The propylene content is 90 mol % or more.
PP-2; MFR230 3.0 g/10 min, MT = 40 mN, melting point 160° C. VP103, manufactured by Prime Polymer Co., Ltd. The propylene content is 90 mol % or more.
PP-3; MFR230 3.2 g/10 min., MT = 13 mN, melting point 140° C. F233D, manufactured by Prime Polymer Co., Ltd. The propylene content is 90 mol % or more.
PBR-1; MFR230 7.0 g/10 min, melting point 75° C., 1-butene content 27 mol %, molecular weight distribution 2.1 Manufactured by using a metallocene catalyst.

INDUSTRIAL APPLICABILITY

A stretched film obtained by a single-layer or multilayer film of the present invention is excellent in transparency and heat-shrinkable properties and is suitable as a film for food packaging, and has extremely excellent utility value in the industry.

What is claimed is:

1. A propylene polymer composition (X) comprising at least two kinds of propylene (co)polymers, wherein the composition comprises 10 to 90% by weight of a propylene (co) polymer (A) which has a melting point in the range of 110 to 170° C., a melt flow rate (MFR) measured at 230° C. in the range of 0.01 to 10 g/10 min and a melt tension in the range of 30 to 200 mN and 90 to 10% by weight of a copolymer (B) of propylene and an α-olefin having 2 to 20 carbon atoms (excluding propylene) which has a melting point in the range of 40 to 100° C. and a melt flow rate (MFR) measured at 230° C. in the range of 0.5 to 50 g/10' min and wherein the composition contains a constitutional unit derived from propylene at a ratio of 70 to 100 mol %, provided that the sum of all the constitutional units of the polymer is 100 mol %, wherein said propylene polymer composition (X) has a flexural modulus in the range of 200 to 1200 MPa and a melt flow rate (MFR) measured at 230° C. in the range of 0.1 to 30 g/10 min, and a melt tension (MT (mN)) measured under the conditions of a take-off rate of 15 m/min and an MFR (g/10 min) measured at 230° C. satisfy the following formula:

$$-0.773 \log(MFR)+1.55 \leq \log(MT) \leq -0.773 \log(MFR)+3.0.$$

2. The propylene polymer composition (X) according to claim 1, wherein the propylene (co)polymer (A) has a melt flow rate (MFR) measured at 230° C. in the range of 1.0 to 7.0 g/10 min.

3. A sheet or film comprising a propylene polymer composition according to claim 1.

4. A stretched film obtained by stretching the sheet or film according to claim 3 in at least one direction by 1.5 times or more.

5. A shrink film comprising the stretched film according to claim 4.

6. A method of producing a shrink-wrapped product, comprising packaging an article by thermally shrinking the stretched film according to claim 4.

7. A method of producing a shrink-wrapped product, comprising packaging an article by thermally shrinking the shrink film according to claim 5.

* * * * *